United States Patent
Janakiraman et al.

(10) Patent No.: US 12,040,958 B2
(45) Date of Patent: Jul. 16, 2024

(54) DYNAMIC MULTI-CLOUD NETWORK TRAFFIC FLOW MONITORING

(71) Applicant: Cisco Technology, Inc., San Jose, CA (US)

(72) Inventors: Rajagopalan Janakiraman, Cupertino, CA (US); Vijay Kumar Devendran, Fremont, CA (US); Kirankumar Meda, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/690,590

(22) Filed: Mar. 9, 2022

(65) Prior Publication Data
US 2023/0318947 A1 Oct. 5, 2023

(51) Int. Cl.
*H04L 43/062* (2022.01)
*G06F 9/455* (2018.01)
*H04L 43/04* (2022.01)
*H04L 43/0852* (2022.01)
*H04L 45/02* (2022.01)

(52) U.S. Cl.
CPC ........ *H04L 43/062* (2013.01); *G06F 9/45558* (2013.01); *H04L 43/04* (2013.01); *H04L 43/0852* (2013.01); *H04L 45/02* (2013.01); *G06F 2009/45595* (2013.01)

(58) Field of Classification Search
CPC ....... H04L 43/062; H04L 45/02; H04L 43/04; G06F 9/45558
See application file for complete search history.

(56) References Cited

U.S. PATENT DOCUMENTS

| 8,209,415 | B2* | 6/2012 | Wei | H04L 47/822 |
| | | | | 709/224 |
| 10,979,334 | B1* | 4/2021 | Bagrin | H04L 43/10 |
| 11,546,292 | B1* | 1/2023 | Deshpande | H04L 41/12 |
| 2010/0281388 | A1* | 11/2010 | Kane | H04L 41/145 |
| | | | | 709/224 |
| 2011/0153549 | A1* | 6/2011 | Cherng | H04L 41/0873 |
| | | | | 707/603 |
| 2013/0046887 | A1 | 2/2013 | Malloy et al. | |
| 2016/0301609 | A1* | 10/2016 | Veres | H04L 43/062 |
| 2016/0359672 | A1* | 12/2016 | Blair | H04L 47/825 |

(Continued)

OTHER PUBLICATIONS

The PCT Search Report and Written Opinion mailed Jun. 15, 2023 for PCT application No. PCT/US23/14867, 16 pgs.

*Primary Examiner* — William G Trost, IV
*Assistant Examiner* — Adam A Cooney
(74) *Attorney, Agent, or Firm* — Lee & Hayes, P.C.

(57) ABSTRACT

This disclosure describes dynamically monitoring the flow of traffic along a path that can include points across different cloud service provider networks/regions and/or different private networks. Flow monitoring may be started in response to different triggering events. For instance, flow monitoring of network traffic along one or more network paths may be started in response to performance metrics associate with an application within the multi-cloud environment, current/projected network conditions associated with one or more networks within the multi-cloud environment, and the like. In other examples, a user may specify when to perform flow monitoring for one or more network paths.

20 Claims, 7 Drawing Sheets

(56) References Cited

U.S. PATENT DOCUMENTS

| | | |
|---|---|---|
| 2017/0244614 A1* | 8/2017 | Wu ..................... H04L 47/762 |
| 2018/0077224 A1* | 3/2018 | Moon ..................... H04L 67/10 |
| 2018/0219734 A1 | 8/2018 | Tofighbakhsh et al. |
| 2019/0123970 A1 | 4/2019 | Rastogi et al. |
| 2019/0123985 A1 | 4/2019 | Rao et al. |
| 2019/0238633 A1 | 8/2019 | Rao et al. |
| 2020/0007396 A1* | 1/2020 | Fainberg ............... H04L 43/045 |
| 2020/0052985 A1* | 2/2020 | Ball ....................... H04L 41/16 |
| 2020/0285547 A1 | 9/2020 | Shukla et al. |
| 2021/0126870 A1* | 4/2021 | Thiel ..................... H04L 41/147 |
| 2021/0273953 A1* | 9/2021 | Fellows ................ G06F 21/554 |
| 2021/0351995 A1 | 11/2021 | Sheeja |
| 2021/0385071 A1* | 12/2021 | Watson ............... H04L 63/0227 |
| 2021/0399959 A1* | 12/2021 | Barry ................... H04W 40/04 |
| 2022/0166722 A1* | 5/2022 | Dave ..................... H04L 45/24 |
| 2022/0191099 A1* | 6/2022 | Pieczul .............. H04L 41/0894 |
| 2023/0246962 A1* | 8/2023 | Choi .................. H04L 41/0806 |
| | | 709/238 |

* cited by examiner

DYNAMIC MULTI-CLOUD NETWORK TRAFFIC FLOW MONITORING

TECHNICAL FIELD

The present disclosure relates generally to monitoring network traffic flow across different networks of a multi-cloud environment.

BACKGROUND

Network flow monitoring allows authorized users to examine network traffic that is flowing between different points within a network. For example, the traffic that is flowing between networks devices within the network may be monitored. In some examples, a user may specify different network IP addresses within the network to monitor. The data collected from the network flow monitoring may be used for a variety of different purposes (e.g., improving network performance, identifying security risks, identifying usage, . . . ). Monitoring traffic that flows across different networks, however, is challenging.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

This disclosure describes, in part, a method that includes determining an occurrence of a trigger event that indicates to monitor network traffic within a multi-cloud environment, wherein a flow of the network traffic includes at least a first network endpoint within a first network of the multi-cloud environment and a second network endpoint within a second network of the multi-cloud environment. The method may further comprise configuring a routing of the network traffic within the multi-cloud environment to perform network traffic monitoring, wherein the routing directs the network traffic to one or more monitoring engines configured to perform one or more operations relating to traffic monitoring, as well as generating, via the one or more monitoring engines, a copy of at least a portion of the network traffic flowing between the first network endpoint and the second endpoint. The method may further include transmitting, via the one or more monitoring engines, the copy to a destination for monitored traffic and transmitting, via the one or more monitoring engines, the traffic toward the second endpoint.

In some instances, determining the occurrence of the trigger event comprises receiving a request to monitor the traffic flow from a computing device associated with a user. In other instances, determining the occurrence of the trigger event comprises receiving a notification of the trigger event from an application executing on behalf of a customer within the multi-cloud environment, wherein at least a portion of the network traffic is generated by the application.

In addition, the configuring the routing of the network traffic may comprise selecting a network virtual appliance (NVA) to perform operations relating to the traffic monitoring. In these instances, the method may further comprise selecting the NVA based, at least in part, on one or more metrics, wherein the one or more metrics include at least one of a latency metric, a bandwidth metric, or a processing metric associated with the NVA and one or more other NVAs available to perform the traffic monitoring.

In addition, the configuring the routing of the network traffic may comprise identifying one or more of a first NVA within the first network and a second NVA within the second network to perform the traffic monitoring in some instances. In other instances, configuring the routing of the network traffic may comprise updating one or more routing tables to route the network traffic to the one or more monitoring engines to perform the traffic monitoring.

This disclosure also describes, in part, a system comprising a multi-cloud environment that includes at least a first network and a second network, one or more processors; and one or more non-transitory computer-readable media storing computer-executable instructions that, when executed by the one or more processors, cause the one or more processors to perform operations that include determining an occurrence of a trigger event that indicates to monitor network traffic within the multi-cloud environment, wherein a flow of the network traffic includes at least a first network endpoint within the first network and a second network endpoint within the second network. The operations may further include configuring a routing of the network traffic within the multi-cloud environment, wherein the routing directs the network traffic to one or more monitoring engines configured to perform one or more operations relating to traffic monitoring, as well as generating, via the one or more monitoring engines, a copy of at least a portion of the network traffic flowing between the first network endpoint and the second endpoint. In addition, the operations may include transmitting, via the one or more monitoring engines, the copy to a destination for monitored traffic and transmitting, via the one or more monitoring engines, the traffic toward the second endpoint.

In addition, this disclosure describes, in part, A non-transitory computer-readable media storing computer-executable instructions that, when executed by one or more processors, cause the one or more processors to perform operations of determining an occurrence of a trigger event that indicates to monitor network traffic within a multi-cloud environment, wherein a flow of the network traffic includes at least a first network endpoint within a first network of the multi-cloud environment and a second network endpoint within a second network of the multi-cloud environment, configuring a routing of the network traffic within the multi-cloud environment to perform network traffic monitoring, wherein the routing directs the network traffic to one or more monitoring engines configured to perform one or more operations relating to traffic monitoring, causing a copy of at least a portion of the network traffic flowing between the first network endpoint and the second endpoint to be generated, causing the copy to be transmitted a destination for monitored traffic, and causing the network traffic to be transmitted toward the second endpoint.

Additionally, the techniques described herein may be performed via methods, devices, systems, and/or non-transitory computer-readable media storing computer-executable instructions that, when executed by one or more processors, performs the techniques described herein.

EXAMPLE EMBODIMENTS

This disclosure describes techniques for dynamic multi-cloud network traffic flow monitoring. As used herein, "network traffic" (which may also be referred to as "traffic") refers to the amount of data moving between at least two points across one or more networks at any given point in time. In contrast to monitoring network traffic within a single network, the techniques described herein include monitoring the flow of network traffic between and within different networks of a multi-cloud environment.

The traffic monitoring can be for one or more network paths that can include points within and across different cloud service provider networks/regions and/or different private networks. As used herein, the term "network path" refers to a connection between two or more different endpoints within one or more networks. For example, a network path may include different endpoints between a first instance of an application executing in a first network and a second instance of the application executing the second network.

In some configurations, monitoring of network traffic may be started in response to a triggering event and can also be stopped in response to a triggering event. For instance, the monitoring of network traffic along one or more network paths may be started/stopped in response to performance metrics associated with an application within the multi-cloud environment, current/projected network conditions associated with one or more networks within the multi-cloud environment, and the like. In other examples, a user may specify when to perform flow monitoring for one or more network paths.

According to some examples, when monitoring the network traffic for one or more network paths is triggered, the user traffic is redirected to a network device that is configured to copy the traffic, provide the copy of the traffic to a destination, and then deliver the user traffic to the specified destination. In some configurations, the configuration of the route associated with the monitoring can be based on operating/performance characteristics of one or more network components configured to route the network traffic within the multi-cloud environment. For instance, a software-defined network (SDN) controller within a network may select a network virtual appliance (NVA), from available NVAs, within the network to redirect the traffic for flow monitoring.

The selection may be based on performance metrics of the available NVAs within the network (e.g., available bandwidth, CPU/Memory utilization that maps to the processed packets per second of the NVA, ... ). In this way, the impact for monitoring of the traffic is reduced. In some examples, the copy of the traffic may be encapsulated to include additional information relating to the traffic compared to the original traffic that is flowing within the network. Traffic can be monitored for end-to-end traffic associated with an application.

As briefly discussed above, in contrast to static monitoring network traffic between two or more points within a single network, the techniques include dynamically monitoring the flow of network traffic flow between and within different networks of a multi-cloud environment. For instance, the monitoring may be started/stopped in response to different triggering events. The triggering events may include events caused by a user (e.g., manually initiating a flow via a user interface element) and/or events that occur within the multi-cloud environment (e.g., network performance metrics, application performance metrics, ... ).

According to some configurations, the monitoring of network traffic along one or more network paths can be started based on performance metrics of an application within the multi-cloud environment. For example, metrics associated with the performance of an application may be obtained using an application/service executing within one or more of the networks. The metrics may include, but are not limited to average response time, error rates, count of application instances, request rate, CPU usage, application availability, throughput, Apdex that measures a user's general level of satisfaction when using an application, memory usage, and the like. In other examples, the metrics used to trigger the monitoring of the traffic flow can be associated with the performance of one or more of the networks within the multi-cloud environment. For instance, the network metrics can include but are not limited to input/output operations per second (TOPS), file storage performance, caching, autoscaling, throughput, latency, CPU usage, and the like.

In some configurations, an authorized user may specify the traffic flow to monitor. For instance, a user may specify to perform flow monitoring for traffic associated with one or more applications and/or specify what network devices to include within the monitoring (e.g., using a classless inter-domain routing (CIDR)/subnet prefix). A user may also specify to monitor traffic flow based on other criteria (e.g., production/non-production flows, billing flows, ... ). The user may also specify to monitor the traffic to a destination and/or from the destination.

As briefly discussed above, when the monitoring of the traffic flow is triggered, traffic that flows along the designated path(s) is monitored. According to some configurations, a monitoring engine is configured to perform operations relating to flow monitoring (e.g., routing user traffic to be copied, copying traffic flow, sending the copy of the traffic flow to one or more destinations, ... ). The monitoring engine may be one or more hardware components and/or one or more software components within the multi-cloud environment. In some examples, the monitoring engine can include the use of an SDN controller that communicates with hardware within the multi-cloud environment and directs the traffic. NVAs can also be used by the monitoring engine to perform operations relating to the monitoring of the flow.

In some examples, an SDN knows what applications are deployed within the multi-cloud network as well as what networks are being used by the application. According to some configurations, an application can request an SDN to perform operations relating to the flow monitoring for one more paths (e.g., traffic to one or more destinations, traffic from one or more destinations, ... ). In some examples, an application or some other device/component, may monitor metrics indicating the performance of the application and request the SDN to perform monitoring in response to a trigger associated with one or more of the metrics. Once the trigger is generated, the SDN configures the path to monitor and begins the dynamic flow monitoring.

According to some configurations, networks within the multi-cloud environment may include two or more NVAs to enhance performance and availability. In some examples, an SDN controller within a network selects an NVA within the network to redirect the traffic for flow monitoring. The selection may be based on performance metrics of the available NVAs within the network (e.g., available bandwidth, CPU/Memory utilization that maps to the processed packets per second of the NVA, . . . ). In this way, the impact for monitoring of the traffic is reduced.

After configuration of the one or more network devices, the traffic is directed to the selected NVA. In the example of traffic that flows between two regions of a same cloud service provider, the selected NVA is configured to receive the traffic flow (e.g., from a router) and then forward the traffic flow back to the router for delivery to the destination. In the example of traffic that flows between different networks, such as a cloud service provider network to a private network, or from a first cloud service provider network to a second cloud service provider network, the selected NVA from the sending network may send the data to a selected NVA in the receiving network. Selecting a specific NVA for flow monitoring can help in regulating the available bandwidth on the NVAs. In some examples, the monitoring engine may add additional information to the monitored traffic. For example, the copy of the traffic generated by the monitoring engine may be encapsulated to include additional information relating to the traffic compared to the original traffic that is flowing within the network.

According to some configurations, historical data can be used to determine when to perform traffic monitoring (e.g., for a particular application, or network path). For instance, flow characteristic data can indicate peak utilization hours for an application that indicates to monitor the flow. Flow characteristics can be stored and analyzed to determine patterns that assist in identifying when to perform traffic monitoring. By detecting both the source and destination of the flows of an application, consumers can be determined and saved in the historical flow characteristics data which can be used to generate the pattern of the application consumption.

The flow characteristics can also indicate the size of the flows originating from certain consumer locations which could affect the performance of an application. In addition to within cloud flow patterns, multi-cloud flow pattern analysis that spans across multiple clouds can be determined by obtaining data from the multi-cloud traffic flow monitoring, an end-to-end visibility of the monitored traffic flow helps to enable better application planning, management, and security.

In some configurations, a machine learning mechanism can be used to dynamically determine when to perform traffic monitoring. In some examples, training data (e.g., data relating to performing traffic monitoring) can be used to create a prediction model. The machine learning mechanism may identify data instances, referred to herein as "indicators", that have a strong correlation with an impending monitoring of traffic. The indicators may include metrics, and/or other data events associated with the monitoring of the traffic within a multi-cloud environment. In various examples, the machine learning mechanism may determine weights for individual indicators. The weights may calibrate or apportion the influence of the respective individual indicators. The prediction model may be deployed to analyze current data to identify a likelihood of traffic monitoring. The prediction model can also be updated over time automatically by the machine learning mechanism, or some other component, as data correlations evolve over time.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

Figure 1:
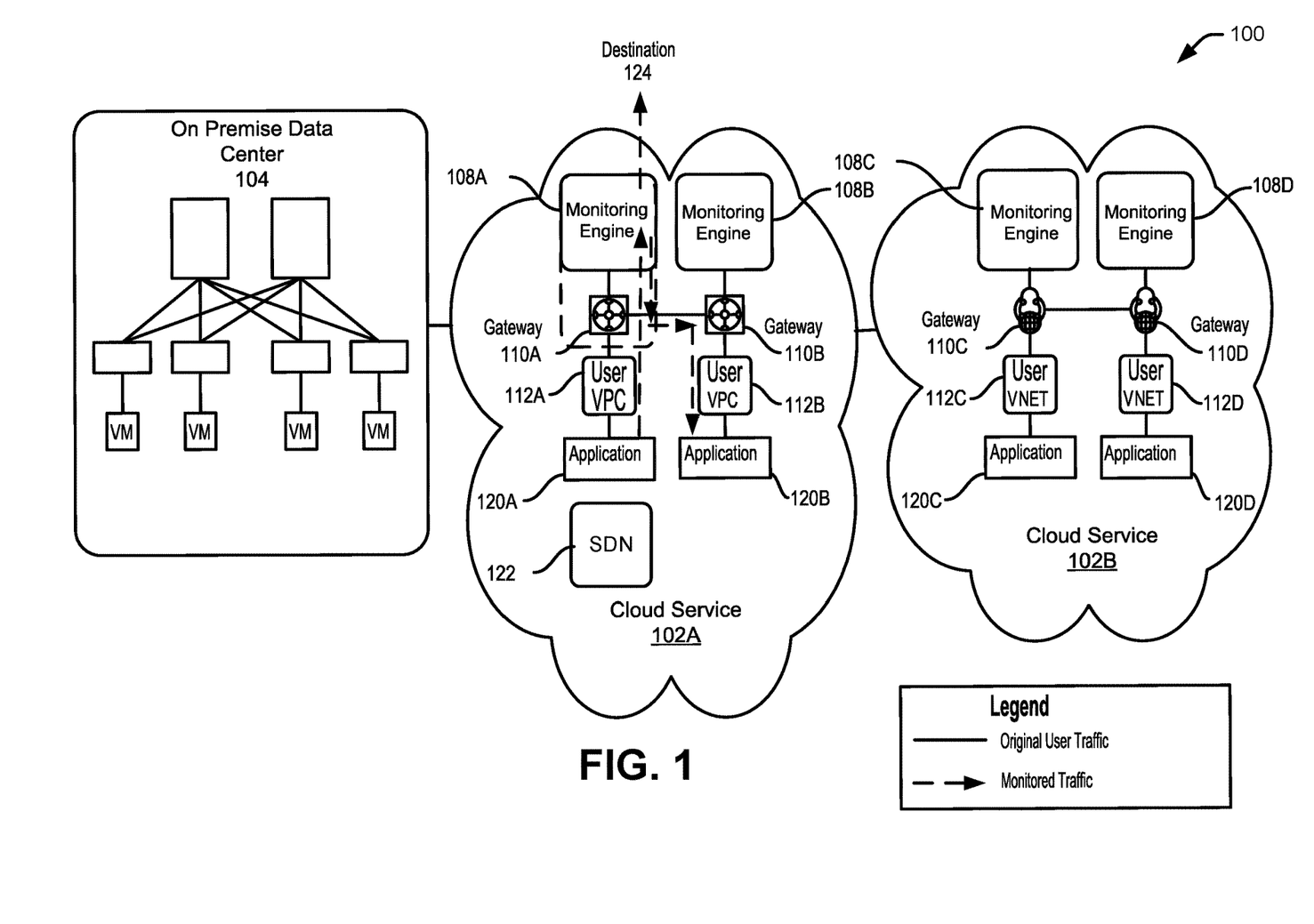
FIG. 1 illustrates a system that dynamically performs multi-cloud network traffic flow monitoring across different networks within a multi-cloud environment.

FIG. 1 illustrates a system that dynamically performs multi-cloud network traffic flow monitoring across different networks within a multi-cloud environment. As illustrated in FIG. 1, cloud services 102, such as cloud services 102A-102B, are configured to communicate with each other as well as one or more other networks, such an on-premise data network 104. Cloud services 102A-102B and on-premise data network 104 may be referred to collectively herein as "networks" or individually as a "network".

Each of the networks may be provided by a different cloud service provider and/or be a different region of a cloud service provider. For example, cloud service 102A may include two or more regions and cloud service 102B may include two or more regions. While two different cloud services 102 are illustrated, more or fewer cloud services 102 may be included within a multi-cloud environment. As illustrated, one or more monitoring engines, such as monitoring engines 108A-108B, can be configured to perform operations relating to traffic flow monitoring across networks of the multi-cloud environment.

As illustrated in system 100, cloud service 102A includes monitoring engine 108A and monitoring engine 108B coupled to gateway 110A and gateway 110B. Gateways 110A and gateway 110B may be coupled to one or more virtual private networks such as user virtual private clouds (VPCs) 112A and 112B. Applications, such as application 120A and 120B may execute within a user VPCs 112A and 112B, and/or at some other location within cloud service 102A. Cloud service 102B includes monitoring engine 108C and monitoring engine 108D coupled to gateway 110C and gateway 110D. Gateways 110C and gateway 110C may be coupled to one or more virtual private networks such as user virtual networks (VNETs) 112C and 112D. Applications, such as application 120C and 120D may execute within a user VNETs 112C and 112D, and/or at some other location within cloud service 102B.

Applications 120 can be executed by one or more computers within a network, such as the networks illustrated in FIG. 1. In some examples, a network can execute an application 120, a "cloud-native application", and/or some other unit of work. A cloud-native application can include a collection of small, independent, and loosely coupled services. Many cloud-native applications employ a microservice architecture. In a monolithic architecture, an application can be built as a single deployable unit. By contrast, in a microservice architecture, a complex system may be split into multiple independent, narrowly focused services, each with its own isolated business logic and data store. In some examples, services of the cloud-native application may be distributed across different cloud environments including one or more public cloud environments, and one or more private networks. In a microservice architecture, typically, any service can be scaled and deployed separately. In these cases, one or more public cloud environments, and/or one or more private networks can host one or more workloads.

An application, such as applications 120, may be hosted by one or more physical computing resources (e.g., one physical machine, two physical machines, . . . ) and/or by one or more virtual computing resources (e.g., one virtual machine, two virtual machines, . . . ). An application 120 may also be migrated (e.g., moved) between different computing resource(s) within a host location as well as between different data centers and/or cloud service providers and/or private networks. In some examples, the host locations may be associated with a same cloud service provider (e.g., different regions of a cloud service provider) and/or associated with different cloud service providers. In other examples, the host locations may include private data centers.

As briefly discussed above, one or more monitoring engines 108, such as monitoring engines 108A-108D, can be used to perform operations to dynamically monitor traffic flow within the multi-cloud environment. More details on monitoring engines 108 are described with reference to FIG. 2. Instead of being limited to a static monitoring tool of a cloud service provider that is configured to perform monitoring for a specific cloud service, the techniques described herein include monitoring the flow of network traffic flow between the different networks of a multi-cloud environment.

According to some configurations, the monitoring of the traffic flow can be dynamically controlled. For instance, monitoring of one or more network paths may be started/stopped in response to different triggering events. The triggering events may include events caused by a user (e.g., manually initiating a flow via a user interface element) and/or events that occur within the multi-cloud environment (e.g., network performance metrics, application performance metrics, . . . ).

According to some configurations, the monitoring of network traffic along one or more network paths, for example from application 120A to 120B (as illustrated by a bolded line in FIG. 1) can be started based on performance metrics of an application, such as application 120A, within the multi-cloud environment. In some examples, an application 120 may obtain/generate the metrics. In other examples, a monitoring engine 108, or some other device/component may obtain metrics associated with a performance of an application 120 and/or other metrics, such as metrics associated with one or more of the networks of the multi-cloud environment. In some configurations, metrics associated with the performance of application 120A may be obtained using an application/service (not shown) executing within one or more of the networks.

The metrics may include, but are not limited to average response time, error rates, count of application instances, request rate, CPU usage, application availability, throughput, Apdex that measures a user's general level of satisfaction when using an application, memory usage, and the like. In other examples, the metrics used to trigger the monitoring of the traffic flow can be associated with the performance of one or more of the networks within the multi-cloud environment. For instance, the metrics can include but are not limited to input/output operations per second (IOPS), file storage performance, caching, autoscaling, throughput, latency, CPU usage, and the like.

In some examples, an authorized user may specify the traffic flow to be monitored. For instance, a user may specify to perform flow monitoring for traffic associated with one or more applications, such as application 120A, and/or specify what network devices to include within the monitoring (e.g., using a CIDR/subnet prefix). CIDR is a set of Internet protocol (IP) standards that is used to create unique identifiers for networks and individual devices. The IP addresses allow particular information packets to be sent to specific computers. CIDR IP addresses consist of two groups of numbers, which are also referred to as groups of bits. The most important of these groups is the network address, and it is used to identify a network or a sub-network (subnet). The lesser of the bit groups is the host identifier. The host identifier is used to determine which host or device on the network should receive incoming information packets. A user may also specify to monitor traffic flow based on other criteria (e.g., production/non-production flows, billing flows, . . . ). The user may also specify to monitor the traffic to a destination and/or from the destination.

According to some configurations, a monitoring engine 108 and/or some other component or device determines that the monitoring of the traffic flow is triggered (e.g., by user input, by application input, or identification of a triggering event). In response to the monitoring being triggered, an SDN 122, the monitoring engine 108, or some other device or component, configures the traffic flow for monitoring. For example, the SDN 122 may update one or more routing tables to route the user traffic to be monitored to a monitoring engine 108 selected to perform the monitoring.

A monitoring engine 108 may include one or more hardware components and/or one or more software components within the multi-cloud environment. In some examples, the monitoring engine 108 can include functionality of an SDN controller that communicates with hardware within the multi-cloud environment and directs the traffic. NVAs can also be used by the monitoring engine to perform operations relating to the monitoring of the flow.

According to some examples, the SDN 122 includes information about the applications 120 that are deployed within one or more of the networks within the multi-cloud environment. An SDN 122 can also be configured to determine what networks are being used by an application 120. For instance, in the example illustrated in FIG. 1, the SDN 122 (which may be included in a monitoring engine 108) may determine that application 120A has a traffic flow that goes from application 120A to user VPC 112A through gateway 110A that are in a first region of a cloud service 102A to a gateway 110B to user VPC 112B to application 120B that is in a second region of the cloud service 102A.

As briefly discussed above, an application 120, such as application 120A can request SDN 122, monitoring engine 108, and/or some other device/component to perform the flow monitoring. In the example of FIG. 1, the application 120A monitors metrics indicating the performance of the application 120A and requests the SDN 122 to perform traffic flow monitoring in response to a trigger associated with one or more of the metrics.

In response to the notification by the application 120A to begin flow monitoring in a single direction from application 120A to application 120B, the SDN 122 or some other device/component configures the path to monitor and begins the dynamic flow monitoring along the monitoring path that is illustrated by the dashed lines on the path between application 120A and application 120B in FIG. 1. Generally, the SDN 122 configures the traffic from application 120A to be directed to monitoring engine 108A and then return through gateway 110A to be delivered to gateway 110B, to user VPC 112B and application 120B. When monitoring engine 108A receives the traffic to be monitored, the monitoring engine 108A can make a copy of the traffic and send it to one or more destinations 124. In some examples, the monitoring engine 108A may add additional information to the monitored traffic. For example, the copy of the traffic generated by the monitoring engine 108A may be encapsulated to include additional information relating to the traffic compared to the original traffic that is flowing within the network.

In some configurations, an agent (not shown) that may be operating as part of the application, or is associated with the application, can generate the triggering events to start/stop the traffic flow monitoring. According to some examples, the agent/application 120 may tag the computing resource (e.g., the virtual machine (VM)) that is running the application 120 or tag the subnet where the application is deployed. Depending on the environment in which the application 120 is running, tagging a VM can be replaced with labels for Kubernetes, or some other object tagging scheme can be used. The agent/application 120 can keep track of the performance metrics of the application.

The agent/application 120 can determine what traffic flows to monitor by tagging the appropriate computing resources, and/or subnets. For example, the agent can tag a computing resource (e.g., a VM) at particular source IP address where the application 120 is running, a destination IP address of a computing resources, or may tag a source subnet and/or a destination subnet to track more traffic flows. In some configurations, a monitoring engine 108 establishes the traffic flow monitoring in response to detecting the presence of the tags associated with the application 120.

To disable the traffic monitoring, the tag(s) can be removed by an agent/application 120. A monitoring engine 108 then detects that the tags are removed, and the traffic flow monitoring is stopped. Tagging the computing resource hosting the application 120 (e.g., the VM), or tagging the subnet allows the application 120 to specify the traffic flows to monitor.

According to some configurations, the traffic flows that are monitored by a monitoring engine 108 (e.g., an NVA associated with the monitoring engine 108) can be iteratively used to setup the route to redirect the traffic flow in other parts of the network to corresponding monitoring agents for network wide flow collection. As an example, assume that a multi-cloud environment spans different regions and incudes different subnets. If the traffic flows for an application that is hosted within a first subnet of a first region are to be monitored, the traffic flows towards a destination subnet and the flows from the first subnet of the first region can be redirected to an available NVA in the first region.) The traffic flows monitored by the selected NVA in the first region indicate that a second subnet and a third subnet are sending/receiving traffic from the first subnet. The second subnet can be identified to be within a second region and the third subnet may be identified with a third region. In some examples, the monitoring engine may identify the regions based on the different routes identified from the traffic flows. In the second and third regions, The NVAs that are closer to the second and third subnets can be identified by the monitoring engine, routes can be established using these NVAs to redirect traffic to/from the second subnet/first subnet and third subnet/first subnet to the respective NVAs (e.g., a second NVA of the second subnet and a third NVA of the third subnet). Now the traffic flows can be combined across the first NVA of the first subnet, the second NVA of the second subnet, and the third NVA of the third subnet to determine network performance characteristics (e.g., latency, jitter and packet loss).

Although a network can span many different regions and across many different clouds with potential traffic flows to an application in the first subnet originating from any one of them, probes can be selectively setup in the network where it is needed, as compared to establishing probes throughout all of the network. If the traffic flows are mined for a particular application over a period of time, the selective probing can be setup based on predictive techniques as well.

While the above process can be recursive to one level, in the event of certain failures, especially related to bandwidth, other traffic flows tracked through the network may be causing the side effects and also track all the hops in between. In the above example, if the traffic flow latency is higher, or traffic drop for traffic flows between the first NVA and the second NVA (while for the traffic flows between the first NVA and the third NVA are fine), additional probes may be established between the NVAs to identify any problems. Also, the spectrum of traffic redirected to the NVAs can be widened based on affinity characteristics (e.g., subnets closer to source, destination and using the same paths). As an example, a traffic flows for a neighboring subnet that is closer to the second subnet can be tracked. This may be iterated for this subnet. More details are provided below in the description of the FIGS. 2-7.

Figure 2:
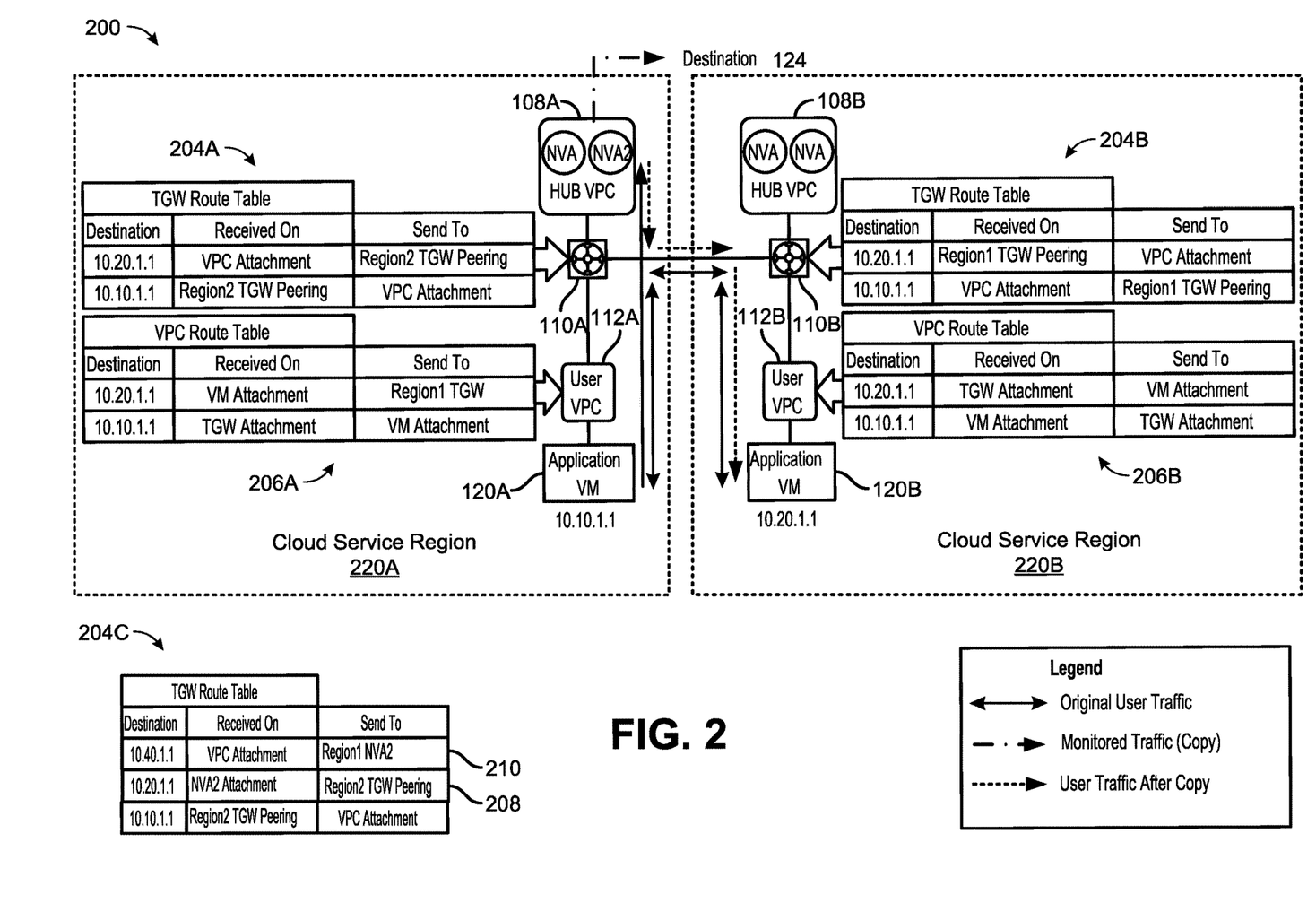
FIG. 2 illustrates a system that configured to dynamically perform multi-cloud network traffic flow monitoring across different regions of a cloud service provider.

FIG. 2 illustrates a system 200 that configured to dynamically perform multi-cloud network traffic flow monitoring across different regions of a cloud service provider. FIG. 2 is similar to FIG. 1 but includes further details relating to configuring routing tables for performing network traffic monitoring within a multi-cloud environment. Referring to FIG. 2, monitoring engine 108A is configured to send and receive data to/from different networks, such as between cloud service region 220A of cloud service 102A and cloud service region 220B of cloud service 102A.

The multi-cloud environment can include networks of different cloud service providers, regions of cloud service providers, and/or private networks. In some configurations, the different networks can be connected using NVAs. According to examples, a network may include two or more NVAs (as illustrated within monitoring engine 108A and monitoring engine 108B) to assist in routing data between the different networks within the multi-cloud environment.

As discussed above in the description of FIG. 1, the application 120A, some other device/component, or an authorized user can trigger the traffic flow monitoring. In response to the triggering event (e.g., a notification by the application 120A) the SDN 122, monitoring engine 108, or some other device/component configures the path to monitor and begins the dynamic flow monitoring. In the example of FIG. 2, an authorized user has specified to perform flow monitoring in a single direction from application 120A to application 120B, As illustrated, an SDN configures the traffic to flow from application 120A to monitoring engine 108A and then return through gateway 110A to be delivered to gateway 110B, to user VPC 112B and application 120B.

As illustrated in FIG. 2, the monitoring engine, SDN, or some other device/component may configure one or more routing tables, such as routing tables 204A, 204B, 204C, 206A, and 206B, to add an NVA, or some other device or component, to receive the traffic to be monitored such that the NVA can make a copy of the traffic and provide the copied traffic to one or more destinations 124. In the current example, the monitoring engine 108A and the monitoring engine 108B include two NVAs that can be configured as a cloud services router (CSR), a firewall device, or any other device/component capable of flow copy for monitoring.

Including two or more NVAs within a monitoring engine 108 help to enhance performance and availability. In some examples, an SDN, such as SDN controller 122 within a network selects the NVAs within the network to use during the performance of traffic flow monitoring. The selection may be based on performance metrics of the available NVAs within the network (e.g., available bandwidth, CPU/Memory utilization that maps to the processed packets per second of the NVA, . . . ). In this way, the impact for monitoring of the traffic is reduced.

After configuration of the one or more network devices, the traffic is directed to the selected NVA. In the current example, the selected NVA is configured to receive the traffic flow (e.g., from gateway 110A) and then forward the traffic flow back to the gateway 110A for delivery to the destination, such as application 120B. In some examples, the monitoring engine may add additional information to the monitored traffic. For example, the copy of the traffic generated by the monitoring engine may be encapsulated to include additional information relating to the traffic compared to the original traffic that is flowing within the network.

In response to the triggering event to enable the flow monitoring, the SDN controller 122 updates one or more routing tables to include the use of the selected NVA. For the current example, routing table 204A has been updated to routing table 204C. Before traffic monitoring for the flow as indicated by the dashed line in FIG. 1, VPC route table 206A, TGW route table 204A, TGW route table 204B, and VPC route table 206B illustrate the routing settings for the original user traffic before traffic monitoring is performed. TGW route table 204C indicates the routing table that is updated by the SDN, or some other device/component when performing the traffic monitoring. As can be seen, 10.20.1.1 routing element has changed from "Region2 TGW peering" in routing table 204A to "NVA2 Attachment" as illustrated by row 208 of routing table 204C. An additional row 210 has been added to routing table 204C that adds the VPC attachment 10.40.1.1. of the monitoring engine 108A where the SDN has selected the Region1 NVA2 to receive and process the received user traffic for monitoring.

As discussed above, updating one or more routing tables can direct the user traffic to a selected NVA, such as NVA2 in the monitoring engine 108A of the current example, that may be within the same region or different region of a cloud service provider. In some examples, the least loaded NVA is identified (e.g., by the SDN 122) for performing operations relating to routing the user traffic and the monitoring of the traffic that includes making a copy of the user traffic. The selection of the NVA(s) can include the CPU/Memory utilization of each of the NVA. CPU/Memory utilization of an NVA maps to the processed packets per second and available bandwidth can be determined using this information.

When the NVA2 of the monitoring engine 108A receives the traffic to be monitored, the NVA2 can make a copy of the traffic and send it to one or more destinations 124. In some examples, the monitoring engine 108A may add additional information to the monitored traffic.

In some configurations, the SDN 122, a monitoring engine(s) 108, or some other device may calculate a score based on the metrics and/or other data to determine when to perform network traffic monitoring. In other examples, the monitoring engine(s) 108 may utilize a machine learning mechanism to determine when to perform network traffic monitoring.

The machine learning mechanism can use a prediction model that is trained using various data, such as metrics, and/or other data. As briefly discussed above, the machine learning mechanism may identify indicators that have a strong correlation with an impending network traffic monitoring. The indicators may include metric(s), and/or other data/events associated with determining when to perform network traffic monitoring. In various examples, the machine learning mechanism may determine weights for individual indicators. The weights may calibrate or apportion the influence of the respective individual indicators. The workload prediction model may be deployed to analyze current data to identify when to perform network traffic monitoring. The prediction model can also be updated over time automatically by the machine learning mechanism, or some other component, as data correlations evolve over time.

Figure 3:
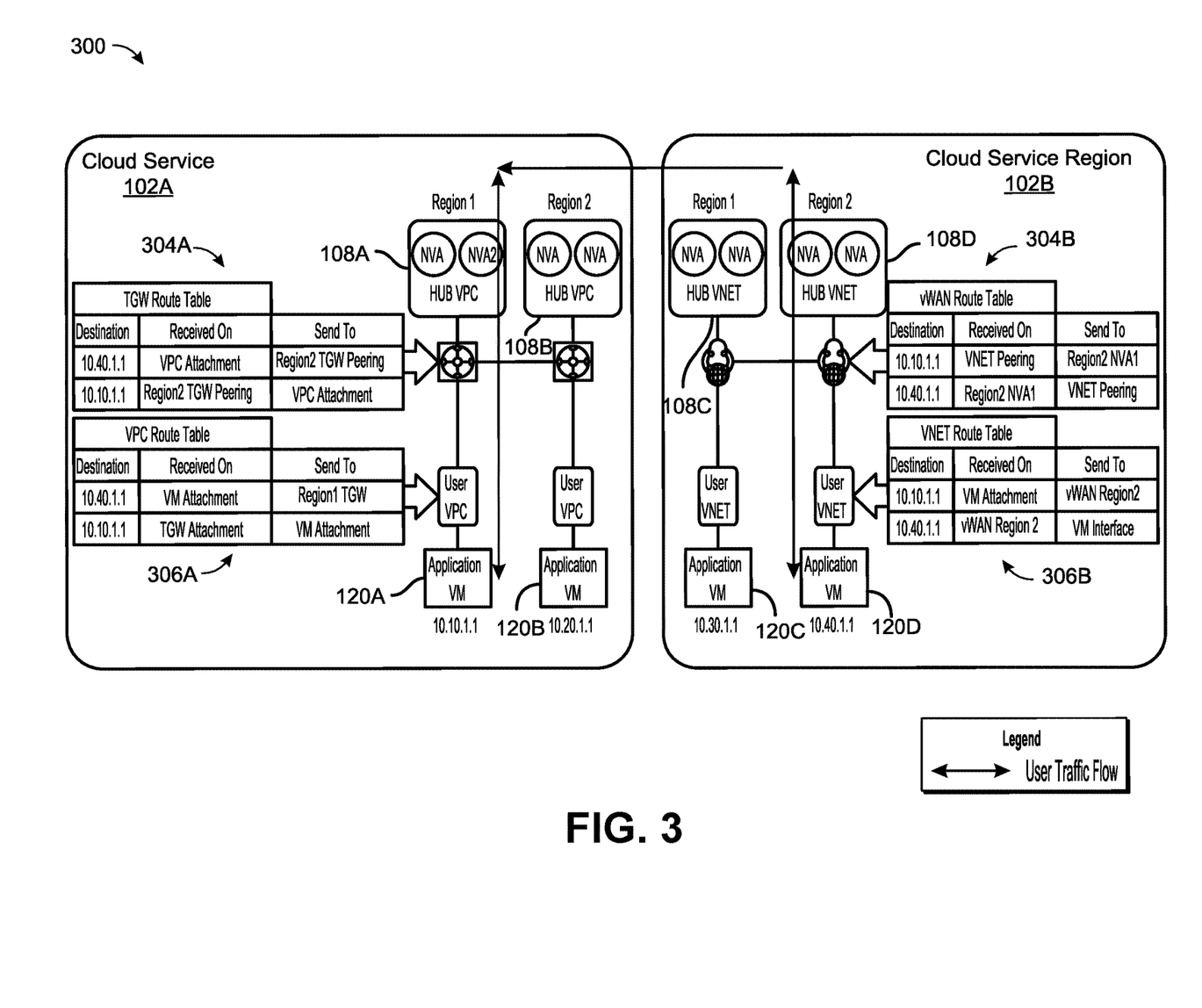
FIG. 3 illustrates a system that is configured to dynamically perform multi-cloud network traffic flow monitoring across different cloud services provided by different cloud service providers.

FIG. 3 illustrates a system 300 that is configured to dynamically perform multi-cloud network traffic flow monitoring across different cloud services provided by different cloud service providers. FIG. 3 is similar to FIG. 1 but includes further details relating to configuring routing tables for performing network traffic monitoring across different service providers within a multi-cloud environment. Referring to FIG. 3, monitoring engine 108A within region 1 of cloud service 102A is configured to send and receive data using NVA 2 between cloud service 102A and cloud service 102B.

FIG. 3. illustrates the user traffic flow before the monitoring flow is monitored. As can be seen, the user traffic flows from application 120A through the attached user VPC, gateway, and to the monitoring engine 108A to the second NVA (NVA2). The NVA2 directs the traffic to region 2 of cloud service 102B that is received by the first NVA within the monitoring engine 108B. The traffic then flows through the attached gateway, user VNET to application 120D. The TWS route table 304A and the VPC route table 306A illustrate the routing of the user traffic through cloud service 102A. The TWS route table 304B and the VPC route table 306B illustrate the routing of the user traffic through cloud service 102B.

Figure 4:
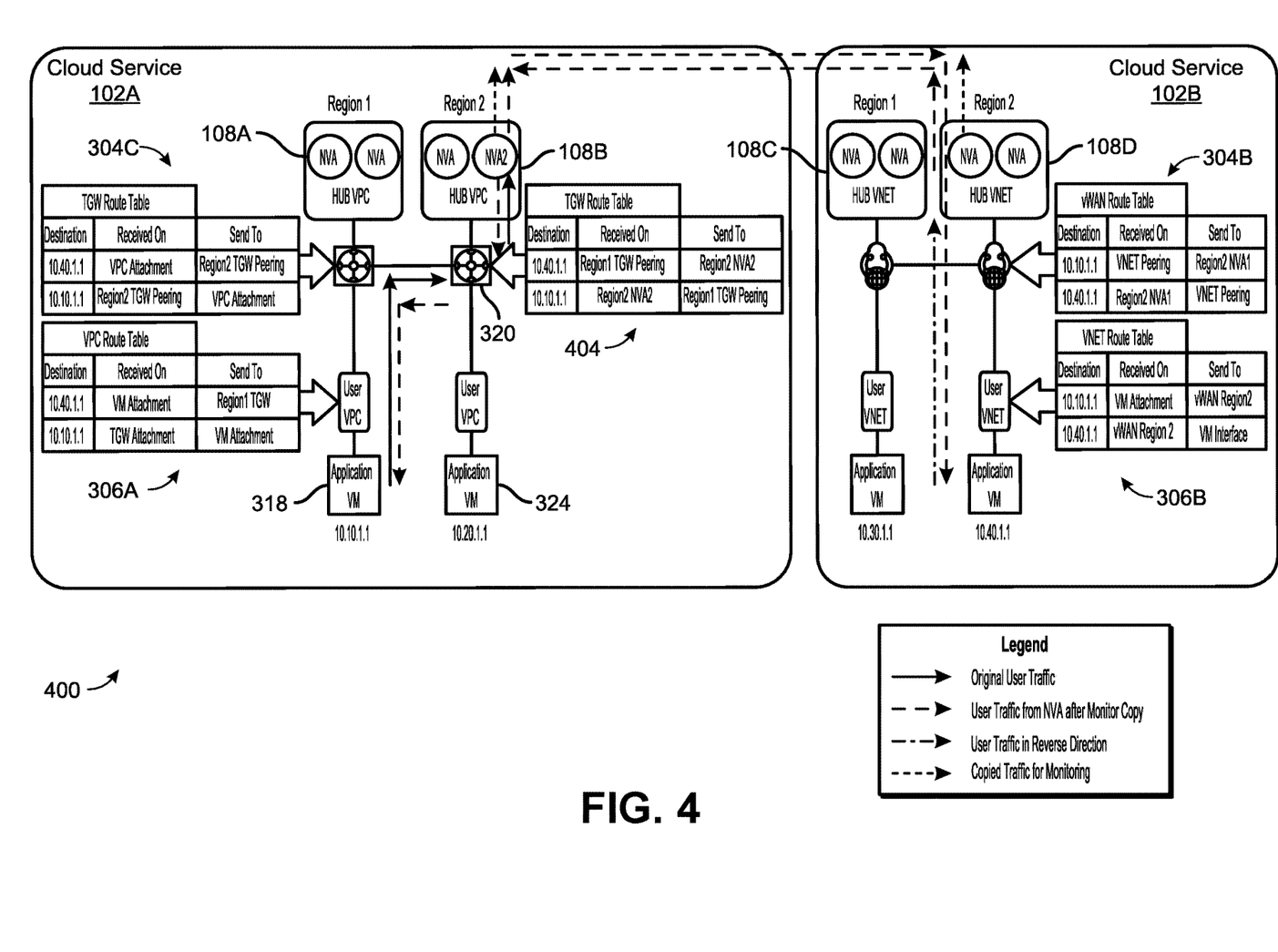
FIG. 4. illustrates a system that is configured to monitor traffic flow in response to being triggered.

FIG. 4. illustrates a system 400 that is configured to monitor traffic flow in response to being triggered. In the current example, the user traffic has been redirected by the SDN 122, or some other device/component to flow through region 2 of the cloud service 102A instead of flowing through region 1 as illustrated in FIG. 3. As discussed above, a different NVA in the same region or different region of a cloud service 102 can be selected to perform the traffic monitoring in an attempt to improve performance.

As can be seen, the user traffic flows from application 120A through the attached user VPC, gateway, and to the monitoring engine 108A to the gateway 320 of region 2 and then to the second NVA (NVA2) of monitoring engine 108B. The NVA2 directs the traffic to region 2 of cloud service 102B that is received by the first NVA within the monitoring engine 108B. The traffic then flows through the attached gateway, user VNET to application 120D. The TGW route table 304C and the VPC route table 306A. The route table 404 has been added by the SDN 122 to instruct the routing of the traffic through the second NVA of the region 2 monitoring engine 108B. The routing of the user traffic through region 2 of cloud service 102A is illustrated by TGW route table 404. The routing of the user traffic within cloud service 102B is illustrated by TGW route table 304B and the VPC route table 306B.

Figure 5:
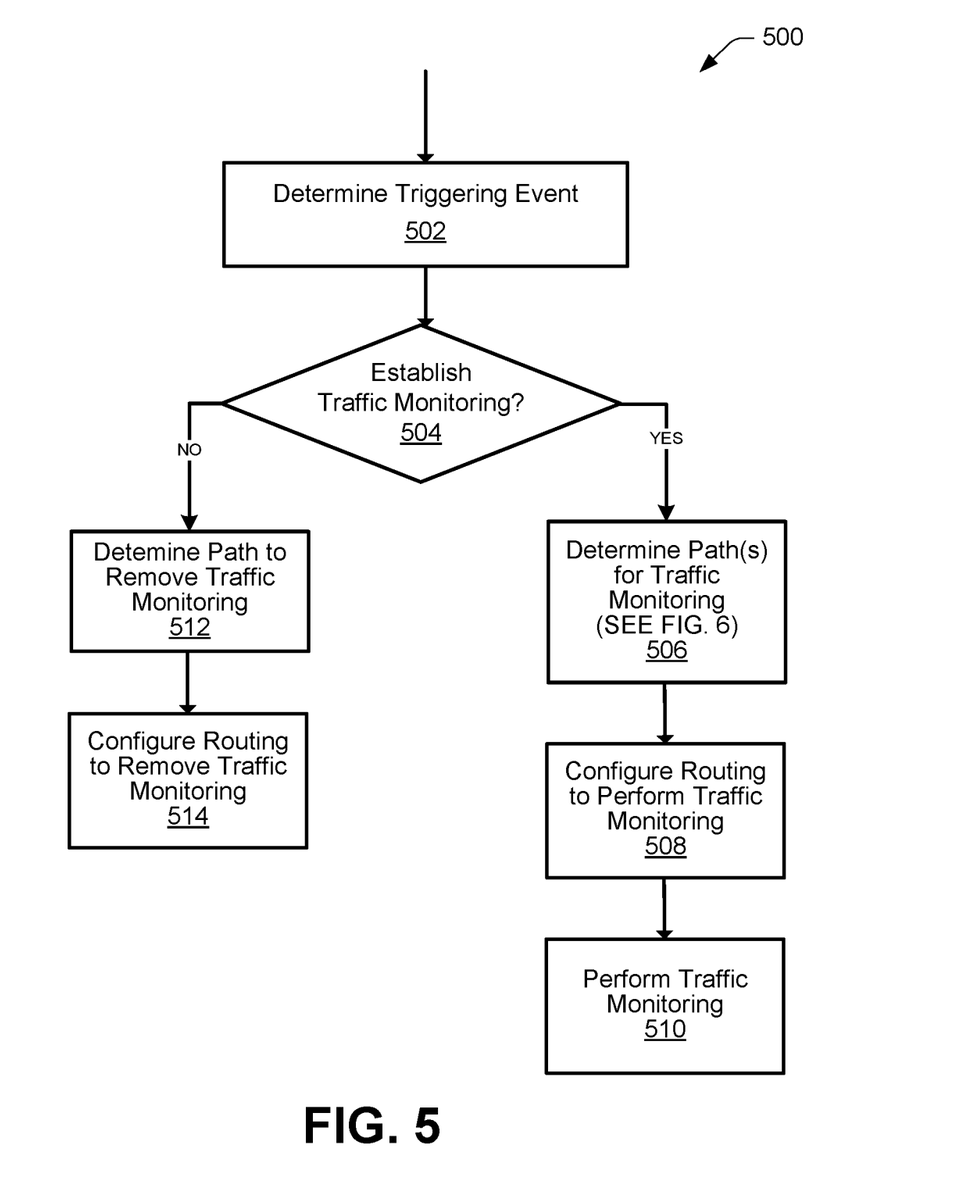
FIG. 5 is a flowchart illustrating a process for dynamically performing multi-cloud traffic flow monitoring.

FIG. 5 is a flowchart 500 illustrating a process for dynamically performing multi-cloud traffic flow monitoring.

At 502, a triggering event is determined. As discussed above, flow monitoring may be started in response to a triggering event and can also be stopped in response to a triggering event. For instance, flow monitoring of network traffic along one or more network paths may be started/stopped in response to performance metrics associated with an application within the multi-cloud environment, current/projected network conditions associated with one or more networks within the multi-cloud environment, and the like. In other examples, a user may specify when to perform flow monitoring for one or more network paths.

At 504, a determination is made as to whether to establish traffic monitoring. As discussed above, a user may specify to establish traffic monitoring and/or traffic monitoring may be established in response to some other triggering event as discussed above. When traffic monitoring is not to be established, the process moves to 510. When traffic monitoring is to be established, the process moves to 506.

At 506, the path(s) to monitor are determined. As discussed above, the path(s) may be associated with traffic flow of an application, a traffic flow specified by a user, and the like. See FIG. 6 and related discussion for more information.

At 508, the configuration of the routing to perform traffic monitoring is performed. As discussed above, the SDN 122, a monitoring engine 108, or some other device/component may configure one or more routes by updating one or more routing tables. As an example, a monitoring engine 108 may be added within a routing table such that the monitoring engine 108 receives the traffic for monitoring.

At 510, the traffic monitoring is performed. As discussed above, a copy of the traffic can be generated by an NVA and then redirect the traffic back to the original destination. In some examples, the monitored traffic can be encapsulated to include additional information before being sent to a destination that is specified for the monitored traffic.

At 512, the path for removing traffic monitoring is determined. As discussed above, the monitoring for a path may be stopped in response to a triggering event. There may be one or more paths to stop monitoring.

At 514, the routing to remove traffic monitoring is configured. As discussed above, the SDN 122, a monitoring engine 108, or some other device/component may configure the routes to remove traffic monitoring by updating one or more routing tables.

Figure 6:
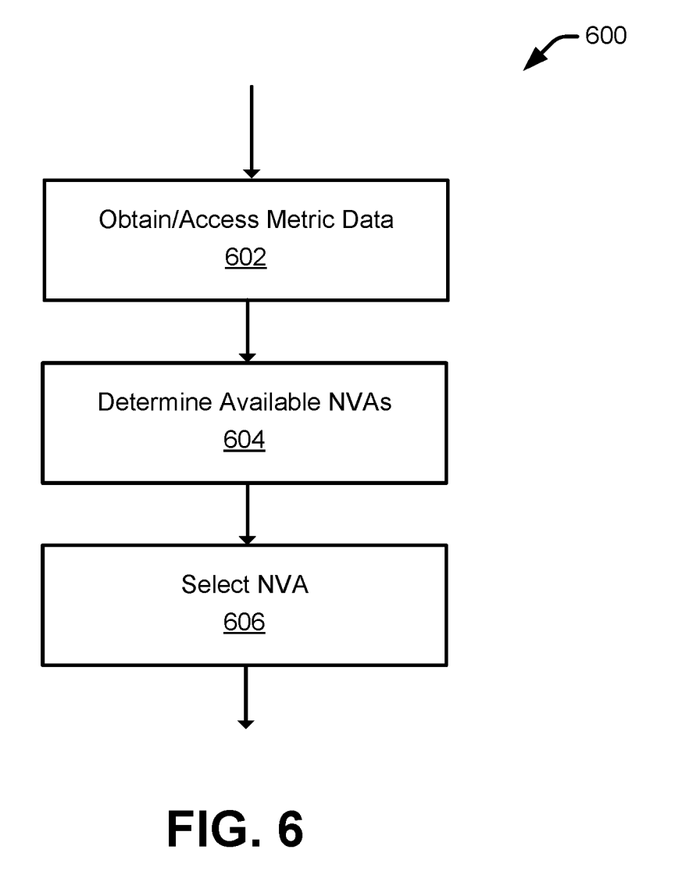
FIG. 6 is a flowchart illustrating a process for determining an NVA to use for traffic monitoring.

FIG. 6 is a flowchart 600 illustrating a process for determining an NVA to use for traffic monitoring.

At 602, metric data is obtained/accessed. The metrics may be obtained through public means (e.g., an API, a webhook, etc.) and can include parameters such as application performance metrics, network performance metrics, packet loss metrics, latency metrics, jitter metrics, available bandwidth, capacity, response time metrics, network reachability, path changes, availability metrics, connect time metrics, and the like.

At 604, the available NVAs that can be used to perform traffic monitoring for a path are determined. As discussed above, regions/networks within the multi-cloud environment may include two or more NVAs to enhance performance and availability.

At 606, an NVA is selected. As discussed above, an SDN controller within a network selects an NVA within the network to redirect the traffic for flow monitoring. The selection may be based on performance metrics of the available NVAs within the network (e.g., available bandwidth, CPU/Memory utilization that maps to the processed packets per second of the NVA, . . . ). In this way, the impact for monitoring of the traffic is reduced.

Figure 7:
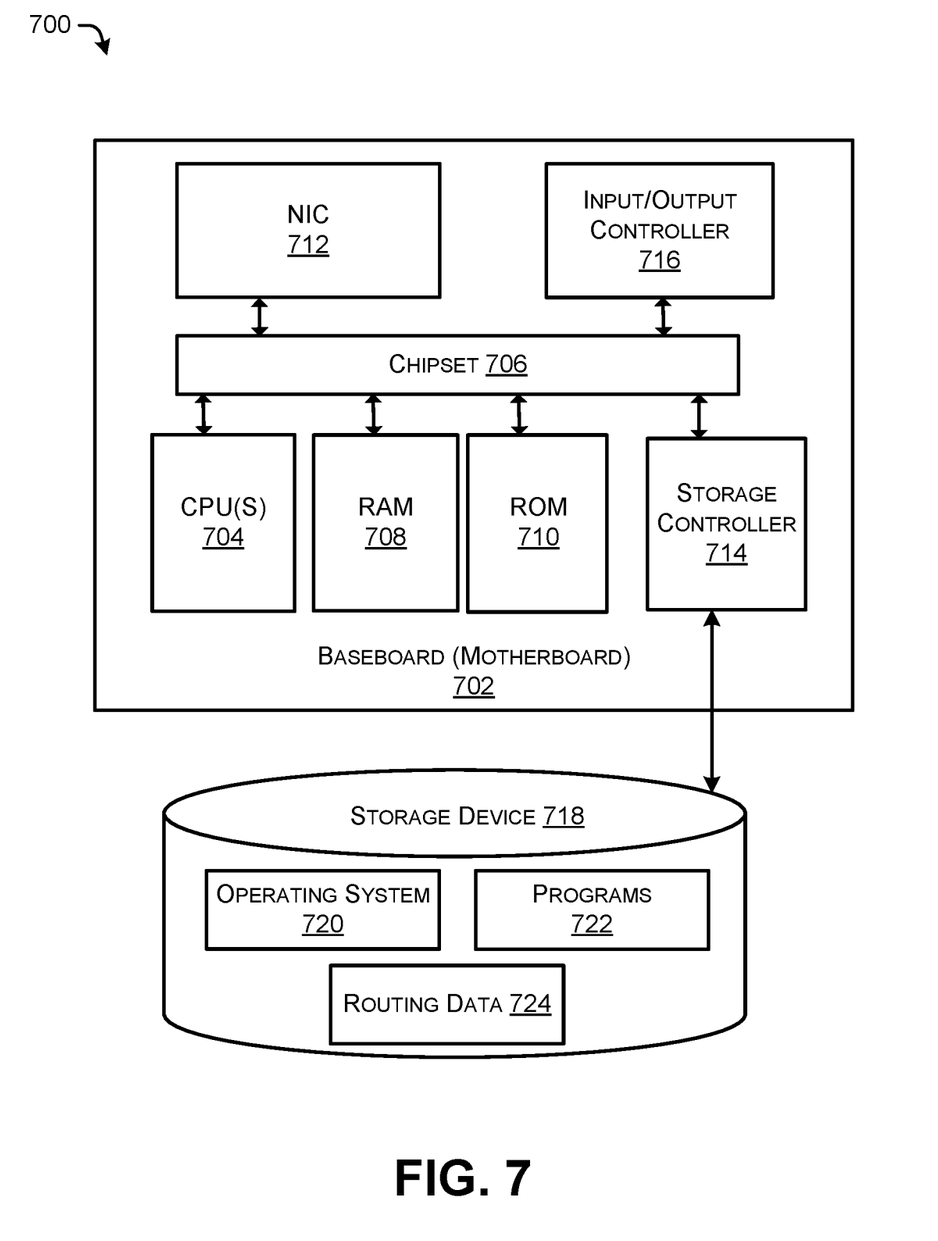
FIG. 7 illustrates an example computer architecture for a computer capable of executing program components for implementing the functionality described herein.

FIG. 7 illustrates an example computer architecture for a computer 700 capable of executing program components for implementing the functionality described above. The computer architecture shown in FIG. 7 illustrates an architecture of a server computer, workstation, desktop computer, laptop, tablet, network appliance, e-reader, smartphone, network switch, or other computing device, and can be utilized to execute any of the software components presented herein. The computer 700 may, in some examples, correspond to a network infrastructure device discussed herein.

The computer 700 includes a baseboard 702, or "motherboard," which may be a printed circuit board to which a multitude of components or devices can be connected by way of a system bus or other electrical communication paths. In one illustrative configuration, one or more central processing units ("CPUs") 704 operate in conjunction with a chipset 706. The CPUs 704 can be, for example, standard programmable processors that perform arithmetic and logical operations necessary for the operation of the computer 700.

The CPUs 704 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 706 provides an interface between the CPUs 704 and the remainder of the components and devices on the baseboard 702. The chipset 706 can provide an interface to a RAM 708, used as the main memory in the computer 700. The chipset 706 can further provide an interface to a computer-readable storage medium such as a read-only memory ("ROM") 710 or non-volatile RAM ("NVRAM") for storing basic routines that help to startup the computer 700 and to transfer information between the various components and devices. The ROM 710 or NVRAM can also store other software components necessary for the operation of the computer 700 in accordance with the configurations described herein. As illustrated in FIG. 7, the ROM 710 or NVRAM can also store data usable by the computer 700 to generate and/or process attestation information in messages exchanged among the computer 700 and other devices. In other examples, this data may be stored elsewhere, such as in RAM 708.

The computer 700 can operate in a networked environment using logical connections to remote computing devices and computer systems through a network. For example, the chipset 706 can include functionality for providing network connectivity through a Network Interface Controller (NIC) 712, such as a gigabit Ethernet adapter. The NIC 712 can connect the computer 700 to other computing devices over a network. It should be appreciated that multiple NICs 712 can be present in the computer 700, connecting the computer to other types of networks and remote computer systems. In some instances, the NICs 712 may include at least one ingress port and/or at least one egress port. An input/output controller 716 may be provided for other types of input/output.

The computer 700 can be connected to a storage device 718 that provides non-volatile storage for the computer. The storage device 718 can store an operating system 720, programs 722, and data 724, for example. The storage device 718 can be connected to the computer 700 through a storage controller 714 connected to the chipset 706. The storage device 718 can include one or more physical storage units. The storage controller 714 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units. The data 724 may include, for example, routing data used for configuring traffic monitoring.

The computer 700 can store data on the storage device 718 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 718 is characterized as primary or secondary storage, and the like. For example, the computer 700 can store information to the storage device 718 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 700 can further read information from the storage device 718 by detecting the physical states or characteristics of one or more particular locations within the physical storage units.

In addition to the storage device 718 described above, the computer 700 can have access to other computer-readable storage media to store and retrieve information, such as program modules, data structures, or other data, including data to generate and/or process attestation information. It should be appreciated by those skilled in the art that computer-readable storage media is any available media that provides for the non-transitory storage of data and that can be accessed by the computer 700.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative of some embodiments that fall within the scope of the claims of the application.

What is claimed is:

1. A method comprising:
   determining occurrences of trigger events that indicate to monitor network traffic within a multi-cloud environment,
   wherein a traffic flow of the network traffic is between at least a first network endpoint comprising a first microservice associated with an application, the first microservice executing within a first network of the multi-cloud environment and a second network endpoint comprising a second microservice associated with the application, the second microservice executing within a second network of the multi-cloud environment, and
   wherein the trigger events comprise one or more trigger events generated by the application based on performance metrics of the application, the performance metrics of the application comprising at least a count of application instances and an application availability;
   configuring a routing of the network traffic within the multi-cloud environment to perform dynamic network traffic monitoring responsive to the occurrences of the trigger events, wherein the routing directs the network traffic to one or more monitoring engines configured to perform one or more operations relating to the dynamic network traffic monitoring;
   generating, via the one or more monitoring engines, a copy of at least a portion of the traffic flow between the first network endpoint and the second network endpoint;
   transmitting, via the one or more monitoring engines, the copy to a destination for monitored traffic; and
   transmitting, via the one or more monitoring engines, the traffic toward the second network endpoint.

2. The method of claim 1, wherein the trigger events further comprise one or more requests to monitor the traffic flow from a computing device associated with a user.

3. The method of claim 1, wherein the trigger events further comprise one or more trigger events generated based on performance metrics of the first network and the second network.

4. The method of claim 1, wherein configuring the routing of the network traffic comprises selecting a network virtual appliance (NVA) to perform operations relating to the dynamic network traffic monitoring.

5. The method of claim 4, further comprising selecting the NVA based, at least in part, on at least a latency metric.

6. The method of claim 1, wherein configuring the routing of the network traffic comprises identifying one or more of a first NVA within the first network and a second NVA within the second network to perform the dynamic network traffic monitoring.

7. The method of claim 1, wherein configuring the routing of the network traffic comprises updating one or more routing tables to route the network traffic to the one or more monitoring engines to perform the dynamic network traffic monitoring.

8. A system, comprising:
   one or more processors; and
   one or more non-transitory computer-readable media storing computer-executable instructions that, when executed by the one or more processors, cause the one or more processors to perform operations of:
   determining occurrences of trigger events that indicate to monitor network traffic within a multi-cloud environment,
   wherein a traffic flow of the network traffic is between at least a first network endpoint comprising a first microservice associated with an application, the first microservice executing within a first network of the multi-cloud environment and a second network endpoint comprising a second microservice associated with the application executing within a second network of the multi-cloud environment, and wherein the trigger events comprise one or more trigger events generated by the application based on performance metrics of the application, the performance metrics of the application comprising at least an average response time and a throughput;

configuring a routing of the network traffic within the multi-cloud environment to perform dynamic network traffic monitoring responsive to the occurrences of the trigger events, wherein the routing directs the network traffic to one or more monitoring engines configured to perform one or more operations relating to the dynamic network traffic monitoring;

generating, via the one or more monitoring engines, a copy of at least a portion of the traffic flow between the first network endpoint and the second network endpoint;

transmitting, via the one or more monitoring engines, the copy to a destination for monitored traffic; and transmitting, via the one or more monitoring engines, the traffic toward the second network endpoint.

9. The system of claim 8, wherein the trigger events further comprise one or more requests to monitor the traffic flow from a computing device associated with a user.

10. The system of claim 8, wherein the trigger events further comprise one or more trigger events generated based on performance metrics of the first network and the second network.

11. The system of claim 8, wherein configuring the routing of the network traffic comprises selecting a network virtual appliance (NVA) to perform operations relating to the dynamic network traffic monitoring.

12. The system of claim 11, the operations further comprising selecting the NVA based, at least in part, on at least a latency metric.

13. The system of claim 8, wherein configuring the routing of the network traffic comprises identifying one or more of a first NVA within the first network and a second NVA within the second network to perform the dynamic network traffic monitoring.

14. The system of claim 8, wherein configuring the routing of the network traffic comprises updating one or more routing tables to route the network traffic to the one or more monitoring engines to perform the dynamic network traffic monitoring.

15. A non-transitory computer-readable media storing computer-executable instructions that, when executed by one or more processors, cause the one or more processors to perform operations of:

determining occurrences of trigger events that indicate to monitor network traffic within a multi-cloud environment, wherein a traffic flow of the network traffic is between at least a first network endpoint comprising a first microservice associated with an application, the first microservice executing within a first network of the multi-cloud environment and a second network endpoint comprising a second microservice associated with the application, the second microservice executing within a second network of the multi-cloud environment, and wherein the trigger events comprise one or more trigger events generated by the application based on performance metrics of the application, the performance metrics of the application comprising at least a central processing unit (CPU) usage and a memory usage;

configuring a routing of the network traffic within the multi-cloud environment to perform dynamic network traffic monitoring responsive to the occurrences of the trigger events, wherein the routing directs the network traffic to one or more monitoring engines configured to perform one or more operations relating to the dynamic network traffic monitoring;

causing a copy of at least a portion of the traffic flow between the first network endpoint and the second network endpoint to be generated;

causing the copy to be transmitted a destination for monitored traffic; and causing the network traffic to be transmitted toward the second network endpoint.

16. The non-transitory computer-readable media of claim 15, wherein the trigger events further comprise one or more requests to monitor the traffic flow from a computing device associated with a user.

17. The non-transitory computer-readable media of claim 15, wherein the trigger events further comprise one or more trigger events generated based on performance metrics of the first network and the second network.

18. The non-transitory computer-readable media of claim 15, wherein configuring the routing of the network traffic comprises:

selecting a network virtual appliance (NVA) to perform operations relating to the dynamic network traffic monitoring; and updating one or more routing tables to route the network traffic to the NVA.

19. The non-transitory computer-readable media of claim 18, wherein selecting the NVA is based, at least in part, on at least a processing metric associated with the NVA and one or more other NVAs available to perform the dynamic network traffic monitoring.

20. The non-transitory computer-readable media of claim 15, wherein configuring the routing of the network traffic comprises identifying one or more of a first NVA within the first network and a second NVA within the second network to perform the dynamic network traffic monitoring.

* * * * *